(12) United States Patent
Kim et al.

(10) Patent No.: US 7,917,507 B2
(45) Date of Patent: Mar. 29, 2011

(54) WEB DATA USAGE PLATFORM

(75) Inventors: Jane T. Kim, Seattle, WA (US); Walter VonKoch, Seattle, WA (US); Sean O. Lyndersay, Redmond, WA (US); Miladin Pavlicic, Sammamish, WA (US); Warren Stevens, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 11/705,286

(22) Filed: Feb. 12, 2007

(65) Prior Publication Data
US 2008/0195628 A1    Aug. 14, 2008

(51) Int. Cl.
*G06F 7/00* (2006.01)
*G06F 17/30* (2006.01)

(52) U.S. Cl. ........................... 707/736; 707/755
(58) Field of Classification Search ............. 707/2–3, 707/10, 102, 203; 714/1; 709/224–225, 709/218, 232
See application file for complete search history.

(56) References Cited

U.S. PATENT DOCUMENTS

| | | |
|---|---|---|
| 5,842,203 A | 11/1998 | D'Elena et al. |
| 5,935,210 A | 8/1999 | Stark |
| 6,081,263 A | 6/2000 | LeGall et al. |
| 6,125,384 A | 9/2000 | Brandt et al. |
| 6,128,624 A | 10/2000 | Papierniak et al. |
| 6,212,494 B1 | 4/2001 | Boguraev |
| 6,282,537 B1 | 8/2001 | Madnick et al. |
| 6,282,548 B1 | 8/2001 | Burner et al. |
| 6,298,401 B1 | 10/2001 | Anderson |
| 6,370,541 B1 | 4/2002 | Chou et al. |
| 6,591,266 B1 * | 7/2003 | Li et al. ................ 707/10 |
| 6,757,674 B2 | 6/2004 | Wiens et al. |
| 6,980,984 B1 | 12/2005 | Huffman et al. |
| 6,990,494 B2 | 1/2006 | Bates et al. |
| 7,003,528 B2 * | 2/2006 | Dan et al. ............. 707/102 |
| 7,017,123 B2 | 3/2006 | Chickles et al. |
| 7,020,667 B2 * | 3/2006 | Guest et al. .......... 707/618 |
| 7,082,436 B1 | 7/2006 | Bayiates |
| 7,133,908 B1 * | 11/2006 | Pajak et al. .......... 709/223 |
| 7,464,122 B1 * | 12/2008 | Basko et al. ......... 707/203 |
| 7,685,273 B1 * | 3/2010 | Anastas et al. ...... 709/224 |
| 7,702,675 B1 | 4/2010 | Khosla et al. |

(Continued)

FOREIGN PATENT DOCUMENTS

JP    2005173823    6/2005

(Continued)

OTHER PUBLICATIONS

"Investigating the strengths of using structured data to search software components in an Internet environment", Date: Jun. 4, 1999, http.//www.itee.uq.edu.au/~seminar/archive/sem-0019.html.

(Continued)

*Primary Examiner* — Kuen S Lu
*Assistant Examiner* — Tuan Pham (57) ABSTRACT

An application programming interface (API) layer is implemented on a computing device. The API layer allows a local application(s) executing on the computing device to access web data in a data store layer, and further allows a remote application(s) that is executing on some other computing device to access the web data in the data store layer. Additionally, this web data can include web pages, some of which may include structured data and some of which may not include structured data. A web browser is permitted to access the web data store via the object model, and generate a user interface based at least in part on these web pages.

20 Claims, 7 Drawing Sheets

U.S. PATENT DOCUMENTS

| | | | |
|---|---|---|---|
| 2001/0011275 A1* | 8/2001 | Lin et al. | 707/9 |
| 2002/0083178 A1 | 6/2002 | Brothers | |
| 2002/0184095 A1 | 12/2002 | Scullard et al. | |
| 2003/0018650 A1 | 1/2003 | Priestley | |
| 2003/0040921 A1 | 2/2003 | Hughes et al. | |
| 2003/0069924 A1 | 4/2003 | Peart et al. | |
| 2003/0085931 A1 | 5/2003 | Card et al. | |
| 2004/0049574 A1* | 3/2004 | Watson et al. | 709/224 |
| 2004/0068527 A1 | 4/2004 | Smith, III | |
| 2004/0088713 A1 | 5/2004 | Myllymaki et al. | |
| 2004/0162895 A1 | 8/2004 | Mok et al. | |
| 2004/0189696 A1 | 9/2004 | Shirriff | |
| 2004/0205076 A1* | 10/2004 | Huang et al. | 707/100 |
| 2005/0177573 A1* | 8/2005 | Gauthier et al. | 707/10 |
| 2005/0216528 A1* | 9/2005 | Cheng | 707/202 |
| 2005/0216825 A1* | 9/2005 | Teague | 715/501.1 |
| 2005/0216886 A1* | 9/2005 | Washburn | 717/110 |
| 2005/0228899 A1* | 10/2005 | Wendkos et al. | 709/232 |
| 2005/0262239 A1* | 11/2005 | Kawakita | 709/224 |
| 2006/0069699 A1 | 3/2006 | Smadja et al. | |
| 2006/0085492 A1* | 4/2006 | Singh et al. | 707/203 |
| 2006/0095345 A1 | 5/2006 | Ka et al. | |
| 2006/0143568 A1 | 6/2006 | Milener | |
| 2006/0149833 A1* | 7/2006 | Dan et al. | 709/218 |
| 2006/0179418 A1 | 8/2006 | Boyd | |
| 2006/0190561 A1* | 8/2006 | Conboy et al. | 709/217 |
| 2007/0050703 A1* | 3/2007 | Lebel | 715/513 |
| 2007/0100834 A1* | 5/2007 | Landry et al. | 707/10 |
| 2007/0174324 A1* | 7/2007 | Palapudi et al. | 707/102 |
| 2007/0239734 A1 | 10/2007 | Arellanes et al. | |
| 2008/0104034 A1* | 5/2008 | Stewart et al. | 707/3 |
| 2008/0195629 A1 | 8/2008 | Kim | |

FOREIGN PATENT DOCUMENTS

| | | |
|---|---|---|
| WO | WO-2008100881 | 8/2008 |
| WO | WO-2008100882 | 8/2008 |

OTHER PUBLICATIONS

"Linking evolved: The future of online research", http://www.researchinformation.info/rispring03linking.html.

Tolliver, Judy, "Deepening Search: Exploiting structured data on the Deep Web" Date: Jun. 12, 2006, http://www.cs.uiuc.edu/research/KevinChang.php.

Bill Burcham,"Baby Steps to Synergistic Web Apps",Date:Oct. 2005,http://lesscode.org/2005/10/21/baby-steps-to-synergistic-web-apps/.

Jon Udell,"Dueling simplicities",Date:Nov. 2005, http://weblog.infoworld.com/udell/2005/11/22.html.

Jack Ozzie,et al."XML Developer Center: Simple Sharing Extensions for RSS and OPML",Date: Dec. 2006,http://msdn.microsoft.com/xml/rss/sse/.

"Page XML Developer Center: Frequently Asked Questions for Simple Sharing Extensions (SSE) e 1 of 4",http://msdn.microsoft.com/xml/rss/ssefaq/.

Bill Burcham,"Half a Baby Step",Date:Nov. 2, 2005,http://lessoode.org/2005/11/02/half-a-baby-step/.

Live Clipboard Example.

Ray Ozzie,"Live Clipboard".

Live Clipboard Screencasts,http://spaces.live.com/editorial/rayozzie/demo/liveclip/screencast/liveclipdemo.html.

"Live Clipboard Technical Introduction",http://spaces.live.com/editorial/rayozzie/demo/ liveclip/liveclipsample/techPreview.html.

Jack Ozzie,et al.,"Live Clipboard",Date:Apr. 2006,http://spaces.live.com/editorial/ rayozzie/demo/liveclip/specification/v092.html.

MacLean et al.,"Microsoft Team RSS Blog",http://blogs.msdn.com/rssteam/archive/2005/12/07/501326.aspx.

Bill Burcham,"Ray Ozzie Demos Web App Clipboard",Date:Mar. 2006,http://www.memerocket.com/2006/03/21/ray-ozzie-demos-web-app-clipboard/.

Ray Ozzie,"Really Simple Sharing"Date: Nov. 20.

Bill Burcham,"Ray Ozzie Got the Memo",Date:Mar. 2006,http://lesscode.org/2006/03/22/ray-ozzie-got-the-memo/.

Microsoft Team RSS Blog : Simple Sharing Extensions for RSS and OPML,http://blogs.msdn.com/rssteam/archive/2005/12/01/498704.aspx.

"Simple Sharing Extensions up dose . . .",http://kinrowan.net/blog/wp/archives/2005/11/23/sse-up-close.

"Microsoft Team RSS Blog",http://blogs.msdn.com/rssteam/archive/2006/01/25/517473.aspx.

eZine Approach Understanding OLE.

Ray Ozzie,"Wiring Progress . . .".

Ray Ozzie,"Wiring the Web".

"Zimbra—Blog—A Pint of ALE—Ajax Linking and Embedding",http://www.zimbra.com/blog/archives/2006/04/zimbra_ale-ajax_linking_and_embedding . . . .

"Zotero—The Next-Generation Research Tool",http://www.zotero.org/.

"Mozilla Corporation",https://addons.mozilla.org/firefox/4106/.

"Mozilla Corporation", https://addons.mozilla.org/firefox/748/.

"Introducing Operator", http://labs.mozilla.com/2006/12/introducing-operator.

"Kaboodle Get Started", http://www.kaboodle.com/zd/help/getStarted.html.

Clipboard.

Hinchcliffe,"Page How Simple Sharing Extensions Will Change the Web (Dion Hinchcliffe's Web 2.0 Blog) e 1 of 10",http://web2.wsj2.com/how_simple_sharing_extensions_will_change_the_web.htm.

Dare Ohasanjo aka Carnage4Life—Metadata Quality, Events Databases and Live Clipboard,http://www.25hoursaday.com/weblog/PermaLink.aspx?guid=91e40df6-c973-4b17-8eb6-0... Dec. 14, 2006.

"Foreign Office Action", Application Serial No. 425-2008, (Oct. 15, 2009),5 pages.

"EP Search Report", Application No. 08729585.3, (Dec. 29, 2009),6 pages.

"Foreign Office Action", Application Serial No. 08729585.3, (Mar. 11, 2010),4 pages.

"Foreign Office Action", Chilean Patent Application No. 426-2008, (Apr. 9, 2010),5 pages.

"PCT Search Report and Written Opinion", Application No. PCT/US2008/053643, (May 29, 2008),11 pages.

"Understanding OLE", *Glencoe McGraw-Hill*, Available at <http://www.glencoe.com/ps/computered/pas/article.php4?articleld=149>, (2001), 3 pages.

Cooley, R. "Web Mining: Information and Pattern Discovery on the World Wide Web", *In Proceedings of ICTATI 2002*, Available at <http://maya.cs.depaul.edu/classes/ect584/papers/cmx-tai.pdf>, (2002), 10 pages.

Kevin, Jaiwei H., et al., "Data Mining for Web Intelligence", *Journal Computer*, vol. 35, Issue 11, Available at <http://citeseerx.ist.psu.edu/viewdoc/download?doi=10.1.1.13.7499&rep=rep1&type=pdf>, (Nov. 2002), pp. 54-60.

"Extended European Search Report", EP Application No. 08729586.1, (Nov. 5, 2010), 3 pages.

"Non-Final Office Action", U.S. Appl. No. 11/705,350, (Nov. 3, 2010), 13 pages.

\* cited by examiner

WEB DATA USAGE PLATFORM

BACKGROUND

The Internet and the world wide web (the web) are becoming an integral part of our daily lives, being used for work, entertainment, research, and so on. Currently, users can access various web pages using a web browser and obtain data from those web pages, such as by manually copying text from those web pages, or sometimes saving images from those web pages or even saving entire web pages. However, there is currently no easy way for other applications to access the data obtained from such web pages. Accordingly, it would be beneficial to have an easy way for data from web pages to be accessed so that it can be used by different applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the web data usage platform, an object model that includes objects representing web data in a data store layer is generated on a computing device. Requests from applications that are executing on the computing device are also received. These received requests are requests to perform an action on the web data, and the requested action is performed.

In accordance with one or more aspects of the web data usage platform, an application programming interface (API) layer is implemented on a computing device. The API layer allows a local application(s) executing on the computing device to access web data in a data store layer. The API layer further allows a remote application(s) that is executing on some other computing device to access the web data in the data store layer.

In accordance with one or more aspects of the web data usage platform, web pages are stored in a web data store. Some of these web pages include structured data, while others do not include structured data. An object model is generated having different objects that represent these web pages. A web browser is permitted to access the web data store via the object model, and generate a user interface based at least in part on these web pages.

BRIEF DESCRIPTION OF THE DRAWINGS

The same numbers are used throughout the drawings to reference like features.

DETAILED DESCRIPTION

A web data usage platform is discussed herein. The platform includes an engine layer, a data store layer, and an application programming interface (API) layer. The engine layer obtains web data and provides it to the data store layer for storage. Changes to web data can also be detected by the engine layer and identified to the data store layer. The data store layer stores the web data, and further stores indicators of collections that the web data is part of. The API layer provides an interface allowing applications executing on the same computing device as the platform, as well as applications executing on other computing devices, to access and use the web data from the data store layer.

Figure 1:
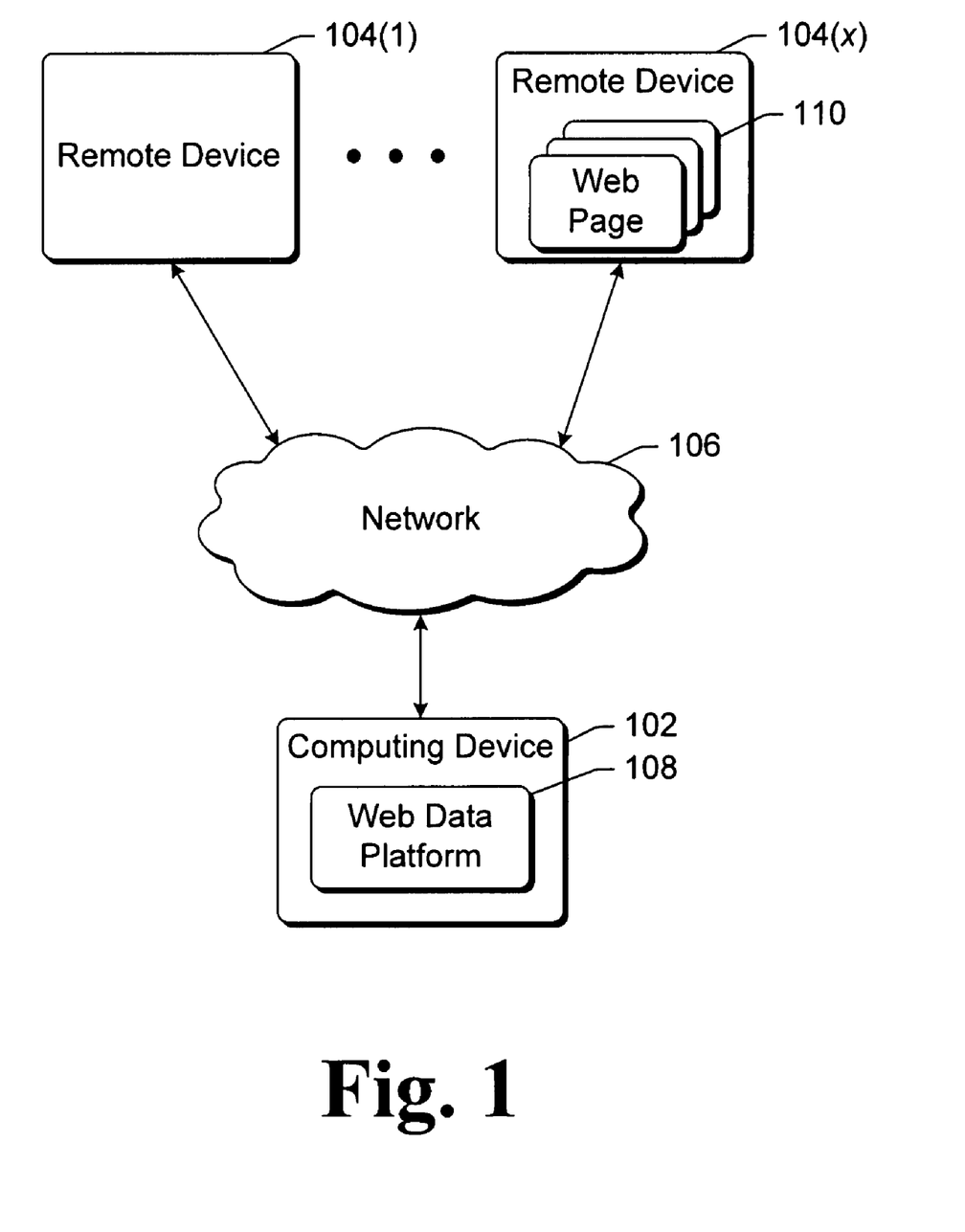
FIG. 1 illustrates an example system in which the web data usage platform can be used in accordance with one or more embodiments.

FIG. 1 illustrates an example system 100 in which the web data usage platform can be used in accordance with one or more embodiments. System 100 includes a computing device 102 that can communicate with multiple (x) remote devices 104(1) . . . 104(x) over a network 106. Network 106 can be any of a variety of networks, including the Internet, a local area network, other public and/or proprietary networks, combinations thereof, and so forth.

Computing device 102 can be any of a variety of different computing devices, such as a desktop computer, handheld computer, laptop computer, server computer, automotive computer, cell phone, personal digital assistant (PDA), game console, and so forth. Computing device 102 includes a web data platform 108 that stores web data and allows applications to access the stored web data. The stored web data includes, for example, web pages, indications of collections of web pages, and so forth, as discussed in more detail below. The stored web data can be obtained by platform 108 from one or more of remote devices 104(1) . . . 104(x). Additionally, the applications that can access the stored web data include applications that are executing on one or more of remote devices 104(1) . . . 104(x), as well as applications that are executing on computing device 102.

Remote devices 104(1) . . . 104(x) are typically server computers, but can alternatively be any of a variety of different computing devices analogous to computing device 102. Remote devices 104(1) . . . 104(x) can store web data that can be retrieved and stored by web data platform 108. Additionally, remote devices 104(1) . . . 104(x) can execute applications that access and make use of web data that is stored by web data platform 108. Some remote devices 104(1) . . . 104(x) may store web data for retrieval by web data platform 108, while others may execute applications to access web data stored by web data platform 108. Alternatively, the same remote device 104 can store web data for retrieval by web data platform 108 as well as execute an application(s) to access web data stored by web data platform 108.

One or more remote devices 104(1) . . . 104(x) store web pages 110. The data in the web pages 110 is obtained by web data platform 108 and stored as web data. One or more web pages 110 can each include one or more pieces of structured data. Structured data is data that is in a format that is known by and expected by a consumer of the data, which is typically a web browser or a behavior (a description of a way that structured data is to be used, as discussed in more detail below). Structured data can be formatted in accordance with known structured data standards, such as the Extensible Markup Language (XML) or HyperText Markup Language (HTML) formats. Alternatively, structured data can be formatted in accordance with other public and/or proprietary standards. Whatever format is used for structured data, this format is known by web data platform 108 so that the structured data can be used by platform 108, as discussed in more detail below. The amount and kind of data that constitutes a piece of structured data can vary, and is defined as part of a data type.

Different pieces of structured data can be of different data types, also referred to as structured data types. A variety of different data types can be used, such as a contact type, an event type, a calendar type, a product type, a picture type, a music type, a trip type, a web page type, a geographic location type, and so forth. A data type can be defined to include any kind of data in different properties or fields, such as a date, a time, mapping coordinates, a name, a phone number, an address, a product description, a destination name, a price, and so forth. Additionally, in certain embodiments an entire web page 110 can be treated as a type of structured data.

The structured data type of a particular piece of structured data can be identified in different manners. In certain embodiments, the structured data itself indicates the data type. For example, different HTML tags can be used to identify different structured data types, or a property or parameter of the structured data itself may identify the structured data type. Alternately or additionally, the structured data can be identified in different manners, such as by using header information in the page 110, or other meta data in page 110 or associated with page 110.

Figure 2:
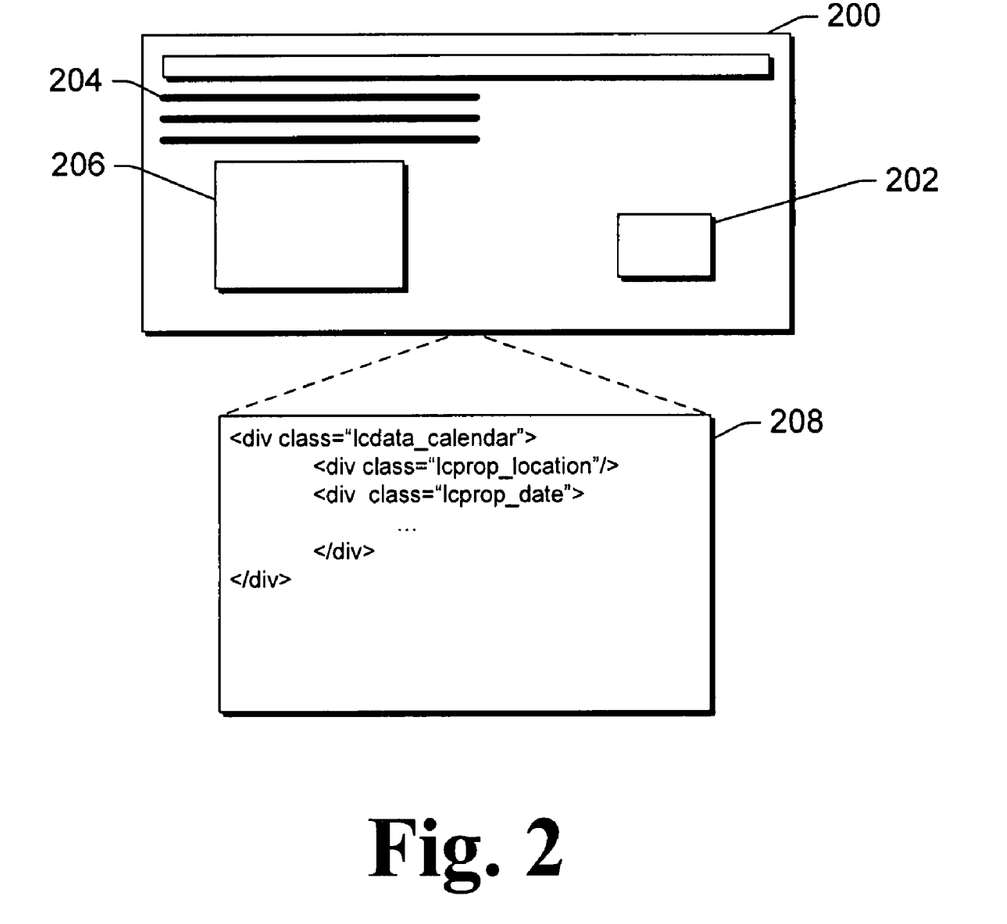
FIG. 2 illustrates an example web page that includes structured data in accordance with one or more embodiments.

FIG. 2 illustrates an example web page 200 that includes structured data in accordance with one or more embodiments. Web page 200 includes a calendar event 202 as well as additional text 204 and images 206. In this particular instance, calendar event 202 has three fields or properties—a location field and two date fields. These fields are described in the page's HTML 208 by, for example, suitable HTML tags such as the illustrated <div class="lcprop_location"/> and <div class="lcprop_date"> tags. In the example of FIG. 2, the HTML tag <div class="lcdata_calendar"> is a calendar event structured data type that is recognized by consumers as structured data.

Returning to FIG. 1, if the web page description does have structured data, then an indicator of structured data is presented to the user along with the page. This indicator is typically a visual indicator, such as an icon, although the indicator may alternatively take different forms (e.g., the indicator may be an audible indicator). Ip certain embodiments, an icon or other visual indicator is displayed next to or near the display of the structured data from the page. For example, if the structured data is an event, then the icon would be displayed near the display of the date and time for that event. In certain embodiments the indicator is presented to the user whenever a page with structured data is displayed to the user. In other embodiments the indicator is presented to the user whenever the user hovers a pointer near a location on the page (as defined by the page description, such as within the structured data itself) for at least a threshold amount of time using a cursor control device.

In one or more embodiments, the browser can present the indicator in different manners, and need not alter the page description itself (e.g., the HTML code describing the page) in order to present the indicator. For example, in the situation where an icon is displayed to the user as the indicator of structured data, the browser can present the icon as an overlay on the page. As such, the HTML code of the page does not need to be modified in order to display this icon. The location of the icon can vary in different embodiments. For example, the browser may analyze the page to identify a blank space (e.g., a space where there is little or no text, links, graphics, or images) in which the icon will be place. The browser may attempt to position the icon close to the display of data corresponding to the structured data (e.g., if the structured data describes an event, then the browser may attempt to position the icon close to the display of a description of the event). By way of another example, the icon may always be displayed in a particular portion of the display (e.g., the top right corner of the window in which the page is being displayed). By way of yet another example, the location for the icon may be identified by the structured data itself (e.g., the structured data may include an indication of where the icon should be placed), and so forth.

In addition to presenting the indicator of the structured data to the user, in one or more embodiments a preview of the content of the structured data can also optionally be displayed to the user. This preview can be, for example, in a separate callout or window overlaying the display of the page, and can display at least some of the content of the structured data. The amount of content displayed in this preview can vary, and can be determined by the designer of the page (e.g., the content to be displayed as the preview can be specified in the structured data itself), or alternatively by the browser (e.g., based on the size of the window in which the browser is displayed, the size of the callout, the amount of content, and so forth). Alternatively, this preview may not be displayed at all, or may not be displayed until after a user selection of the indicator is made.

If a web page has structured data, the structured data itself can be, but need not be, displayed to the user as part of the web page. For example, if the structured data includes various properties (e.g., the date, time, and geographic location for an event (such as a speech)), then the web page may display these properties in various parts of the web page using HTML code that is separate from the structured data. In such situations, the structured data is included in the HTML of the web page but is not displayed to the user. Alternatively, the structured data can be displayed to the user as part of the web page, or a preview of the structured data can be displayed as discussed above.

Additionally, in one or more embodiments options are presented to the user to collect and/or subscribe to structured data. Collecting structured data refers to maintaining a copy of the structured data so that it is accessible to the user of the computing device 102 even when computing device 102 is offline (e.g., is not connected to network 112, or when the remote device 104 from which the web page was retrieved is temporarily unavailable). In one or more embodiments only the structured data is stored in response to selection of the collect option, although in alternate embodiments the entire web page may be stored.

Subscribing to structured data refers to requesting updates to the structured data. When the user is subscribed to changes to the structured data, web data platform 108 accesses, at regular or irregular intervals, a web page to get an updated version of the web page (or alternatively just the structured data from that web page). This updated version is typically received from the same web page as the structured data was originally retrieved from, but alternatively may be another web page, as discussed in more detail below. The web data platform can also compare the updated version of the web page to a previously stored version of the web page, and notify the user of any changes to the web page and/or to the structured data in the web page.

The collect and/or subscribe options can be presented to the user and selected by the user in any of a variety of manners. For example, the user may select an on-screen button, select an option from a pull-down menu, input text in a data entry field, input a voice command via a microphone, and so forth. In one or more embodiments, the collect and/or subscribe options can be selected by the user selecting an on-screen button(s) in a preview window along with the structured data.

Additionally, behaviors can be employed to make use of structured data. A behavior is a description of a way that structured data is to be used, typically to provide a service to the user of computing device 102. A behavior typically resides in the form of software instructions and data or code that is executed by computing device 102, although a behavior may alternatively be implemented in different manners (such as in firmware and/or hardware). Each behavior is associated with one or more structured data types. A behavior that is associated with a particular structured data type knows how to use that data type. For example, a particular piece of structured data may be an event data type, and the particular piece may include a date, time, and description of an event (e.g., a concert, a movie, a meeting, etc.). A calendaring behavior associated with the event data type knows how to extract the particular date, time, and description from the event, and interact with a calendaring program to add an event to the user's calendar having that particular description for that particular date and time.

In one or more embodiments, individual behaviors are programmed or otherwise configured to know how to interact with one or more local applications and/or one or more remote applications. For example, one behavior may know how to interact with the Microsoft® Outlook® messaging and collaboration client; another may know how to interact with the Google™ Calendar; another may know how to interact with another proprietary calendar program; another may know how to interact with an electronic photo album program; and so forth.

In one or more embodiments, behaviors can be installed on computing device 102. Typically, a user of device 102 can navigate, using a web browser, to a particular web page 110 that allows a behavior to be installed. Such a web page 110 includes instructions and data that can be downloaded and executed as the behavior, or alternatively includes a link to such instructions and data. Installing the behavior on computing device 102 refers to downloading the instructions and data for the behavior to computing device 102 and configuring computing device 102 as necessary so that computing device 102 can execute the instructions and data. The web page that allows the behavior to be installed can, but need not, include structured data.

In addition to navigating to web pages as a way to install behaviors, behaviors can be installed on computing device 102 in other manners. That is, behaviors can be installed on computing device 102 using any of a variety of different techniques that can commonly be used to transfer instructions and data to a computing device. For example, a file containing the instructions and data for one or more behaviors can be transferred to computing device 102 via a removable storage device (such as an optical disk, magnetic disk, flash memory device, and so forth), via network 106, via a wired or wireless connection to another computing device, and so forth. By way of another example, one or more behaviors may be pre-installed on computing device 102 so that the behavior is immediately available to the user when he or she first uses computing device 102. Alternately or additionally, one or more behaviors may be installed on computing device 102 when an application is installed on computing device 102, and so forth.

Figure 3:
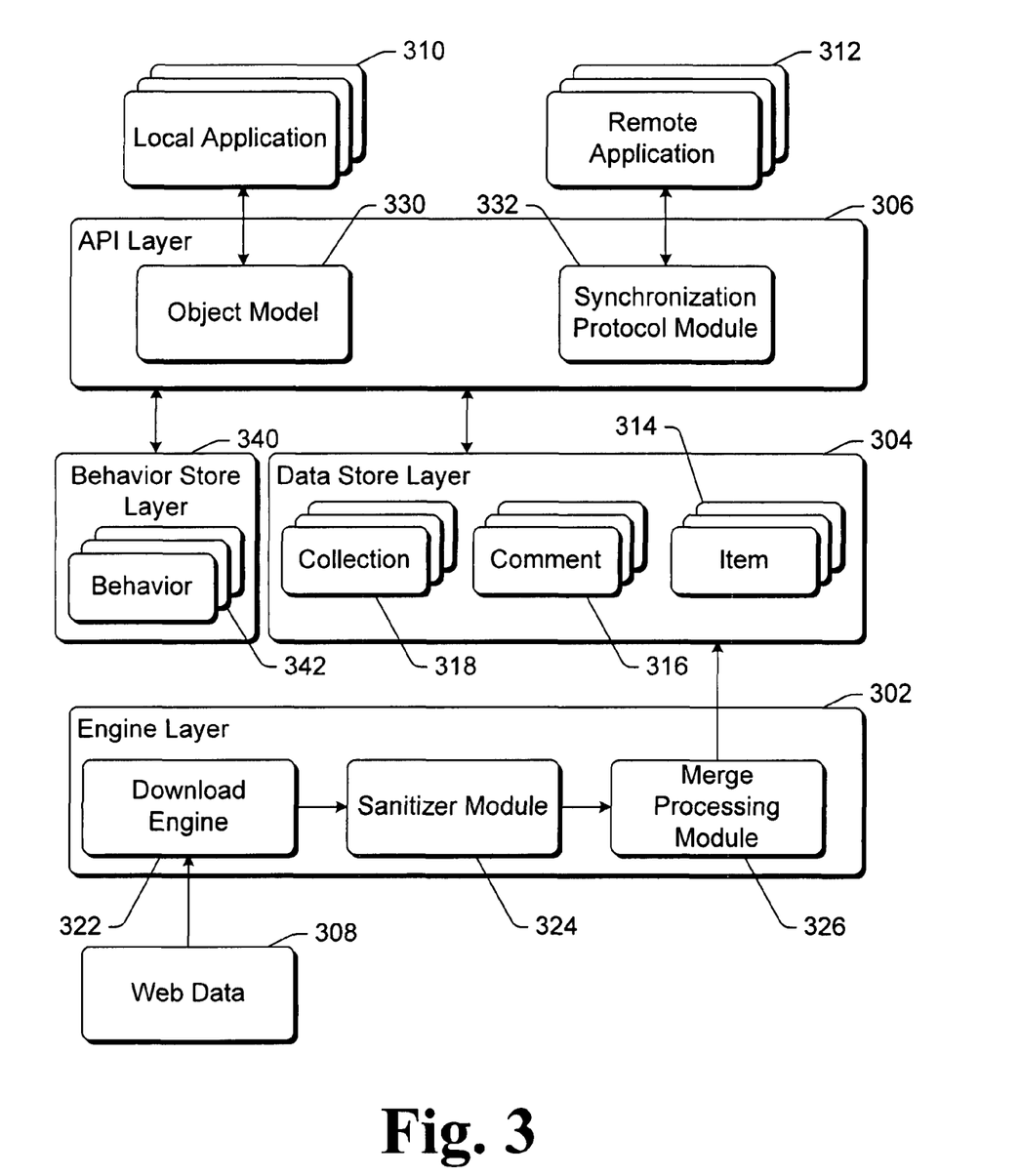
FIG. 3 illustrates an example web data platform in accordance with one or more embodiments.

FIG. 3 illustrates an example web data platform 300 in accordance with one or more embodiments. Web data platform 300 is implemented on a computing device, and can be web data platform 108 implemented on computing device 102 of FIG. 1. Platform 300 is typically implemented on a single computing device, but alternatively can be implemented across multiple computing devices.

Web data platform 300 uses web data. Generally, web data typically refers to data that is available on the web. Web data can include, for example, web pages, specific parts of web pages, indications of collections of web pages, comments, and so forth. In one or more embodiments, the format of the web data is the HTML format, although other markup language formats or other formats could alternatively be used. Platform 300 can optionally alter the format of the web data for storage after the web data is obtained by platform 300.

Web data platform 300 includes an engine layer 302, a data store layer 304, and an API layer 306. Platform 300 may also include a behavior store layer 340. Generally, engine layer 302 obtains web data 308 and provides the data to data store layer 304 for storage. Changes to previously obtained web data 308 can also be detected by engine layer 302 and identified to data store layer 304. Data store layer 304 stores the web data, and further stores indicators of collections that the web data is part of. Data store layer 304 can also store comments on the web data or collections. API layer 306 provides an interface allowing local applications 310 executing on the same computing device as the platform, as well as remote applications 312 executing on other computing devices, to access and use the web data from data store layer 304.

During operation, web data 308 is added to data store layer 304. Web data 308 can be obtained from a variety of different sources. Typically, at least some web data 308 is initially retrieved by a web browser. The web browser can be a local application 310 that interfaces with data store layer 304 via API layer 306. Alternatively, the web browser may transfer the web data to data store layer 304 via engine layer 302. Using the web browser, the user can browse or otherwise navigate to a particular web page, resulting in the web browser displaying that web page to the user. The user can then request to have that web page added to his or her data store. In response to this request, the web page becomes the web data added to data store layer 304. The request to have the web page added to the user's data store can take a variety of different forms, such as a request to have the web page added to the user's list of favorite web pages or bookmarked web pages, a request to collect a web page and/or subscribe to structured data on the web page, a request to store a copy of the web page for offline use, and so forth. Alternatively, when the user navigates to a particular web page using the web browser, that web page may be automatically added to data store layer 304.

Additionally, at least some web data 308 is typically obtained during the process of retrieving updated web pages that have been subscribed to. Such web data 308 is retrieved by engine layer 302 and provided to data store layer 304. Alternatively, web data 308 can be retrieved in other manners, such as receiving a file containing the web data transferred to computing device 102 via a removable storage device (such as an optical disk, magnetic disk, flash memory device, and so forth), via network 106 of FIG. 1, via a wired or wireless connection to another computing device, and so forth. By way of another example, web data may be included in data store 304 as part of an installation or creation process of computing device 102 so that the web data is immediately available to the user when he or she first uses computing device 102. By way of yet another example, web data may be included in data store layer 304 when an application 310 is installed on computing device 102, and so forth. By way of still another example, an application may create web data, such as structured data, and saving that web data to data store layer 304. Such web data can be created in various manners, such as converting a file, generating the data from scratch, and so forth.

Data store layer 304 stores the web data. Data store layer 304 includes one or more items 314, one or more comments 316, and one or more collections 318. Data store layer stores web data and optionally associated data, as discussed in more detail below. The data storage can be implemented in various locations, such as on a local storage device (e.g., part of the same computing device as implements platform 300), on a remote storage device (e.g., part of another computing device remote from the device implementing platform 300), on a removable storage device (e.g., a flash memory device, a disk, etc.), and so forth.

Each item 314 represents a link to a web page, and thus corresponds to or is associated with a web page. An item 314 can include the data for the web page (e.g., the page's HTML code), or alternatively a link to where some or all of the data for the web page is located in data store layer 304. Some web pages can include structured data, while other web pages may not include structured data. For web pages that include structured data, the corresponding item 314 can optionally identify the structured data to allow the structured data to be easily retrieved. In addition to the data for the web page, various meta data describing the link is also included in item 314. Table I describes example meta data that is maintained in each item 314 in one or more embodiments.

another application 310. In one or more embodiments, the grouping is assigned automatically according to the data types of structured data within the linked to web pages. In such embodiments, all web pages having structured data of the same data type are grouped together in the same collection. Additionally or alternatively, the grouping can be assigned by a user. In such embodiments, the user is able to identify names or other identifiers for collections and assign particular items to particular collections according to his or her desires. This assignment can be performed when the web pages are obtained, and/or at other times (e.g., via the web browser or another application 310).

Additionally, one or more applications 310 and/or 312 can register with data store layer 304 to be notified of changes to data store layer 304. Data store layer 304 notifies such applications 310 and/or 312 of changes to an item 314, comment 316, and/or collection 318. In one or more embodiments, applications 310 and/or 312 can register with data store layer 304 to receive notifications of changes to items 314. Data store layer 304 maintains a record of which applications 310 and/or 312 are registered to receive notifications, and notifies each of those applications 310 and/or 312 whenever there is a change to an item 314. Registered applications are typically notified of any change to item 314, including changes to any of the meta data of the item, any additions of items, any deletions of items, and any new comments that are added to the item. Alternatively, an application may register to receive notification of only changes to particular parts of item 314 (e.g., only a change to the structured data or a flag, and so forth), or changes to a particular item 314. Additionally or alternatively, an application may also register for one or more

TABLE I

| Meta Data | Description |
|---|---|
| Update/Read | Identifies whether the web page has been changed, and whether the web page has been displayed to the user since the change occurred. |
| Flag | One or more flag values that can be associated with the web page, such as whether changes to structured data on the web page (or the entire web page) have been subscribed to, how frequently a check for updates to the web page should be made, whether the web page is in the user's favorites list, and so forth. |
| Tag | One or more custom flags. These are typically created by the publisher of the web page, but can be overwritten by others using or accessing the web page, including the user. |
| Share | Identifies whether this web page has been shared, such as with other applications 310 and/or 312 other than the web browser. Optionally may include an identifier of what application the web page has been accessed by. |
| Origin URL | Identifier (e.g., a Uniform Resource Locator or URL) of the location from which the web page was originally obtained. |
| Source URL | Identifier (e.g., a URL) of the location from which updates to the web page should be retrieved. |
| Date Added | Identifies the date (and optionally time) when the user added the link to data store layer 304. |
| Date Updated | Identifies the date (and optionally time) of that an updated version of the web page was saved to data store layer 304. |
| Date Checked | Identifies the date (and optionally time) of the last check for updates for the web page. |

Each comment 316 is associated with an item 314, and can be obtained from the same source from which the web page represented by item 314 is obtained. Each comment 316 can be a single comment, or alternatively a collection of comments associated with the item 314. Each comment includes various information describing the web page represented by item 314, but is typically not displayed as part of the web page.

Each collection 318 identifies one or more items 314 that are grouped together. The grouping is typically performed by a web browser, although it may alternatively be performed by of changes to a collection 318, changes to a comment 316, changes for items 314 having structured data of a particular data type(s), and so forth.

In addition, in one or more embodiments an event notification component of an operating system on which platform 300 executes is leveraged to assist with the registration and notification. In such embodiments, applications 310 and/or 312 can register with an event notification component of the operating system, causing the event notification component to notify the applications 310 and/or 312 whenever an event for which they have registered is received by the event notification component. Applications 310 and/or 312 register for item change events, and data store layer 304 notifies the event notification component of any item changes. The event notification component of the operating system, in turn, fires events to (or otherwise communicates a notification to) the registered applications 310 and/or 312 to notify them of item changes.

Platform 300 also optionally includes a behavior store layer 340 in which one or more behaviors 342 are stored. Each behavior 342 is a description of a way that structured data is to be used, typically to provide a service to the user of the computing device implementing platform 300, as discussed above. When a behavior is installed on a computing device implementing platform 300, a record of which structured data types the behavior is associated with is maintained. This record can be maintained in behavior store layer 340, in data store layer 304, or alternatively in some separate store layer (not shown).

Engine layer 302 obtains web data 308 and provides the data to data store layer 304 for storage. Changes to previously obtained web data 308 can also be detected by engine layer 302 and the changed web data stored in data store layer 304. Additionally engine layer 302 can notify data store layer 304 and/or other components of platform 300 of the changes. This process of identifying changes to a web page and storing the changed version of a web page is also referred to as updating the web page.

Engine layer 302 includes a download engine 322, a sanitizer module 324, and a merge processing module 326. Download engine 322 obtains updated versions of web pages identified by items 314. Download engine 322 typically downloads the identified web page, although alternatively if only a part of the web page is to be updated (e.g., only structured data on the web page), then only that part of the web page need be retrieved. Download engine 322 may obtain updated versions for all web pages represented by items 314, or alternatively obtain updated versions for only those web pages for which updates have been requested by the user (e.g., by subscribing to structured data on the web page or otherwise requesting updates). An indication of whether updates have been requested for a particular web page can be maintained in the meta data of the corresponding item 314 (e.g., as one of the flags discussed above with reference to Table I). For each item 314 for which download engine 322 is to obtain updated versions of the represented web page, the item 314 identifies the location from which updates to the web page should be retrieved (e.g., as the Source URL discussed above).

Generally, a new version of the web page is received by download engine 322 as web data 308 and sanitized by sanitizer module 324 to remove any potentially malicious content. Merge processing module 326 then compares the sanitized web page to a version previously stored in data store layer 304 to determine whether any differences exist between the newly received version of the web page and the previously stored version of the web page. If there are any changes to the web page, then merge processing module 326 stores the newly received web page in data store layer 304, and notifies data store layer 304 and/or API layer 306 that the web page has changed. In one or more embodiments, merge processing module 326 notifies layer 304 and/or layer 306 of any changes to the web page, while in other embodiments, merge processing module 326 notifies layer 304 and/or layer 306 only of changes to structured data on the web page. In still other embodiments, merge processing module 326 notifies layer 304 and/or layer 306 of any changes to the web page, and further notifies layer 304 and/or layer 306 whether any of the changes are to structured data.

How frequently an item is to be updated can vary. In certain embodiments, the item itself includes a property identifying how frequently it is to be updated (e.g., one of the flags discussed above with reference to Table I). In other embodiments other mechanisms are used to determine the frequency, such as a user may input how frequently he or she would like the updating to occur, particular frequencies may be associated with different structured data types, and so forth. The updating may be performed at regular intervals (e.g., once per day, once per hour, once every five minutes, and so forth), or at irregular intervals (e.g., once per day in the days leading up to a particular time and date identified in the item, once per hour on the same date as identified in the item, and once every five minutes on the same date as identified in the item and in the hour immediately preceding a time as identified in the item).

Sanitizer module 324 takes the web page retrieved by download engine 322 and identifies any potentially malicious content on the web page. Sanitizer module 324 removes any such identified content, resulting in a sanitized web page that is made available to merge processing module 326. Sanitizer module 324 can operate in any of a variety of conventional manners to detect potentially malicious content, such as checking for particular tags, using particular algorithms, searching for particular patterns, and so forth.

Merge processing module 326 compares the sanitized web page to the web page previously stored in data store layer 304. Based on this comparison, a check is made as to whether there are any changes to the web page. A change to the web page could be the addition of some data or other content or code to the web page, a deletion of some data or other content or code from the web page, and/or a modification of data or other content or code in the web page. Alternatively, merge processing module 326 may only compare a portion of the sanitized web page (e.g., structured data in the sanitized web page) to a portion of the web page previously stored in data store layer 304 (e.g., structured data in the web page).

If there are no changes to the web page, then merge processing module 326 need take no further action for this item at this time. Alternatively, merge processing module 326 may update the meta data of the item 314 to reflect that an update was performed but that no changes to the web page were detected.

However, if there have been changes to the web page, then the previously stored web page in data store layer 304 is replaced by the newly received web page. This replacement of the old version of the web page with the new version of the web page may be performed by merge processing module 326, or alternatively may be performed by a control component of data store layer 304. When an item 314 has changed, data store layer 304 is notified of the change by engine layer 302. In one or more embodiments, data store layer 304 provides an interface that is accessible to engine layer 302 and allows engine layer 302 to store web pages in data store layer 304 and also allows engine layer 302 to notify data store layer 304 of any changes to a web page.

Changes to a web page are typically identified by engine layer 302 as discussed above. Additionally, changes to a comment are typically identified in an analogous manner, as the comments are obtained by download engine 322 along with the web page. Changes to a collection 318 or behavior 320, however, are typically made by an application 310. Such changes are detected by data store layer when the change is made, and registered applications are notified of such changes analogous to notification of the changes to a web page as discussed above. For example, assume an application 310 changes a collection 318 by invoking a method of an object corresponding to the collection (the object model is discussed in more detail below). Part of the processing of this invoked method is to notify data store layer 304 of the change to the collection 318, typically identifying the particular collection 318 and the change that was made.

API layer 306 provides an interface allowing local applications 310 executing on the same computing device as the platform, as well as remote applications 312 executing on other computing devices, to access and use the web data from data store layer 304. API layer 306 includes an object model 330 and a synchronization protocol module 332. Local applications 310 include a web browser application, as well as any extensions that are added to the web browser application. Extensions can be added to a web browser application by another application 310 or 312, or by a web page, to extend the functionality of the web browser. Additionally, local applications 310 can be any of a variety of types of applications, such as word processing applications, spreadsheet applications, games, databases, and so forth. Similarly, remote applications 312 can be any of a variety of types of applications, such as word processing applications, mapping or direction applications, games, and so forth.

Object model 330 is an object model based on the data in data store layer 304. Object model 330 includes different objects representing items 314, comments 316, and collections 318 of data store layer 304. These objects include various properties that correspond to the data stored as items 314, comments 316, and collections 318. For example, an object representing an item 314 can include a property that has the data for the web page (e.g., the page's HTML code), as well as additional properties for each type of meta data described above with reference to Table I.

Additionally, in embodiments where the web page includes structured data, the structured data itself can be different properties of an item object. For example, assume a web page includes a contact structured data type having a name and a phone number as structured data. This web page is stored as an item 314, and a corresponding object in object model 330 includes properties that are the contact name and contact phone number.

In addition to properties, each object in object model 330 can include different methods that allow an application 310 to interact with the object. Examples of such methods include: a create method, a read method, an edit method, a delete method, and an enumerate method. A create method allows objects to be created and populated with data by an application 310, and corresponding data stored in data store layer 304. A read method allows properties of the object to be retrieved by an application 310. An edit method allows properties of the object to be changed by an application 310, and such changes stored in data store layer 304. A delete method allows the object to be deleted, and the corresponding data deleted from data store layer 304. An enumerate method allows the methods and/or properties of the object to be identified to an application 310.

Additionally, a behavior object model in API layer 306 also includes different objects representing behaviors 342, and allows applications 310 to interact with the objects. This object model can be included as part of object model 330, or alternatively another object model in layer 306. The objects representing behaviors 342 includes various properties that correspond to the behaviors 342. For example, an object representing a particular behavior 342 can include a property that has an identifier of where the code to be executed to carry out the behavior is stored (or alternatively the code could be included as part of the object). The object can also include meta data regarding the behavior 302, such as an identifier of the source of the behavior, an identifier of the services offered by the behavior, an identifier of the structured data types associated with the behavior, and so forth.

Each object in the behavior object model also includes different methods that allow an application 310 to interact with the object. Examples of such methods include: an invoke method, an enumerate behaviors by type method, a read method, an add method, and a delete method. An invoke method allows an application 310 to invoke the behavior represented by the object. The code for the behavior represented by the object is executed when the behavior represented by the object is invoked. A read method allows properties of the object to be retrieved by an application 310. An add method allows a behavior to be added to behavior store 340 and an object representing that behavior added to the behavior object model. A delete method allows a behavior to be deleted from behavior store 340 and the object representing that behavior deleted from the behavior object model.

An enumerate behaviors by type method allows the different behaviors associated with a particular structured data type to be identified to an application 310. This enumeration can be accomplished in different manners, such as by having an additional object in the behavior object model that maintains this information (a method of this additional object can be invoked directly by the application 310, or alternatively can be invoked by the method of another object that was invoked by application 310), by accessing a record of such associations stored in behavior store layer 340 (e.g., which is updated each time a behavior is added or an association is changed), by having the objects in the behavior object model query each other for the structured data types they are associated with, and so forth. An enumerate behaviors method allows the different behaviors 342 that are in behavior store layer 340 to be identified to an application 310. This enumeration can be accomplished in different manners, such as by having an additional object in the behavior object model that maintains this information (a method of this additional object can be invoked directly by the application 310, or alternatively can be invoked by the method of another object that was invoked by application 310), by accessing a record of the behaviors stored in behavior store layer 340 (e.g., which is updated each time a behavior is added or deleted), by having the objects in the behavior object model query each other for the behaviors they represent, and so forth.

Synchronization protocol module 332 allows remote applications 312 to maintain data that is synchronized with the data in data store layer 304. In one or more embodiments, each remote application 312 that desires to receive notifications of events sends an indication of this desire to module 332. Additionally, a remote application 312 can register for notifications to changes to data store layer 304, or alternatively module 332 can register for notifications on behalf of an application 312. Regardless of which of application 312 or module 332 registered for notifications, synchronization protocol module 332 receives the notifications. Module 332 maintains a record of the notifications until the next time it is in communication with the remote application 312, at which point module 332 sends all of the notifications it has received and maintained to remote application 312. Module 332 may also send the corresponding changed data from data store layer 304 to remote application 312, or alternatively wait for remote application 312 to request the data.

Communication between a remote application 312 and synchronization module 332 can be initiated by the application 312 and/or the module 332. In one or more embodiments, an application 312 initiates the communication by sending (e.g., over network 106 of FIG. 1) a request to module 332 for notifications that module 332 has received on its behalf. In other embodiments, application 312 provides an indication to module 332 of how to communicate notifications to the application 312, and module 332 maintains this indication. This indication can be, for example, a URL that is to be accessed when a notification for the application 312 is received. Notifications received by module 332 on behalf of the application 312 are communicated to the application 312 in whatever manner (and with whatever frequency) is defined by the indication given to module 332.

Communication of the changes to the data store layer 304 to remote application 312 allows remote application 312 to keep its own copy of the web data in data store layer 304, and further allows remote application 312 to keep its copy of the web data synchronized with that in web data store layer 304. It should be noted that, when a remote application 312 initially desires to obtain notifications of changes to the web data, all of the web data in data store layer 304 may be viewed as changed because the remote application 312 has not yet received any of the data. In such situations, the current web data in data store layer 304 is typically communicated to the remote application 312.

In addition, in one or more embodiments web pages are able to gain access to data store layer 304 via a web browser application 310. In these embodiments, object model 330 allows a web browser application 310 displaying a web page to access object model 330. In this manner, web pages are able to access and make use of the data in data store layer 304 and the behaviors in behavior store layer 340 without installing an application as an application 310.

Additionally, API layer 306 can control access to APIs and/or different web data in data store layer 304 and/or behavior store layer 340. By controlling such access, different web pages and/or web sites can be restricted to different functionality and/or web data. By way of example, APIs may be separated into different functionality, such as read functionality and write functionality. Different web pages and/or web sites can be permitted to access the write functionality, while others are permitted to access only the read functionality. By way of another example, particular web pages and/or web sites may be restricted to accessing only a particular one or more items 314, a particular one or more collections 318, and so forth. The particular access permitted to particular web pages and/or web sites can be identified by the user of the computing device implementing platform 300, thereby allowing the user to control access to his or her web data.

Furthermore, in one or more embodiments API layer 306 includes a web data picker control module that displays a user interface control that allows a user to select particular web data. The user interface control displays identifiers of at least some of the various web data in data store layer 304 and allows the user of a local application 310 to select particular web data for an action to be performed on. For example, if a local application 310 is displaying information about collections, the application 310 can display to the user a control listing identifiers of the collections from data store layer 304. This allows the user to easily select which collection(s) he or she desires to have displayed. By way of another example, if a local application 310 is displaying information about a particular structured data type (e.g., calendar events, locations, etc.), the application 310 can display to the user a control listing identifiers of the different structured data of that type from data store layer 304. This allows the user to easily select which piece(s) of structured data he or she desires to have displayed. The user interface control is displayed when a request to act on web data is received by the application. The user can request to act on web data in any of a variety of manners, such as selection of an on-screen button, selection of an item from a pull-down menu, request for execution of an application, and so forth.

Figure 4:
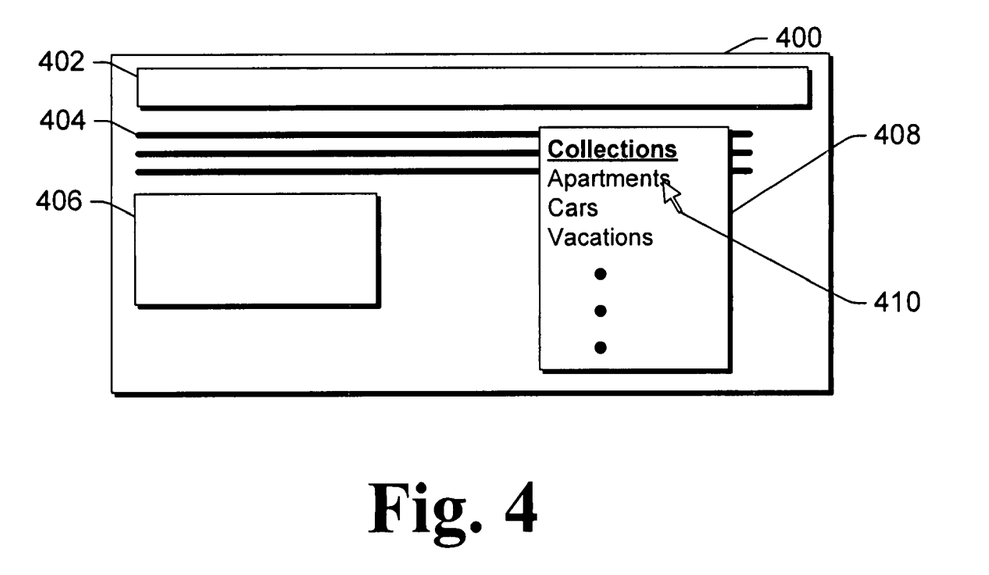
FIG. 4 illustrates an example user interface displaying a user interface control in accordance with one or more embodiments.

FIG. 4 illustrates an example user interface displaying a user interface control in accordance with one or more embodiments. In FIG. 4, an application window 400 is illustrated that includes a title 402 and various text 404 and images 406. Window 400 also includes a user interface control 408 that lists different web data that can be selected by the user. In the illustrated example, control 408 displays collections of items, although it is to be appreciated that items themselves or other web data could alternatively be displayed. The particular web data that is displayed in interface control 408 can vary based on the particular functionality provided by the application generating window 400.

The user can select a particular collection from control 408 in a variety of different manners. In one or more embodiments, the user navigates a pointer or cursor 410 over the identifier in control 408 and clicks a button on a cursor control device (e.g., a mouse) to select the identifier. The identified collection is then acted upon by the application in whatever manner the application is performed to operate.

Figure 5:
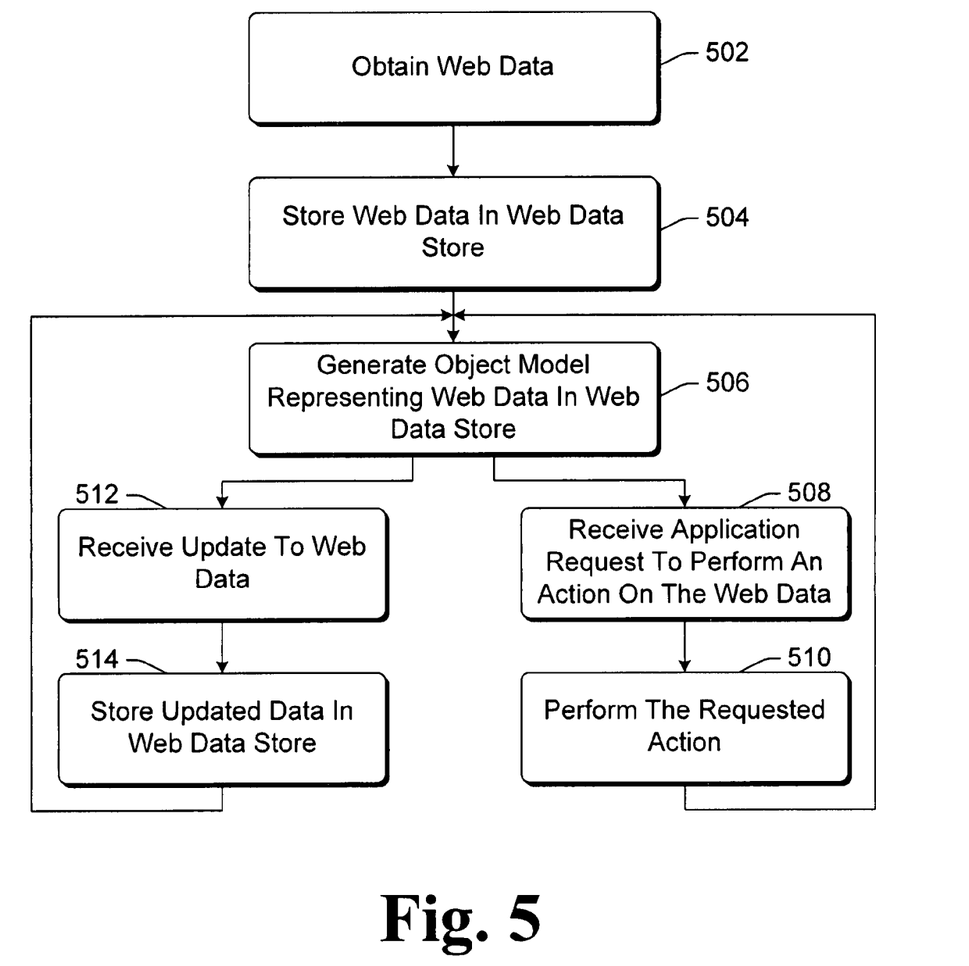
FIG. 5 is a flowchart illustrating an example process for accessing web data from a data store layer in accordance with one or more embodiments.

FIG. 5 is a flowchart illustrating an example process 500 for accessing web data from a data store layer in accordance with one or more embodiments. Process 500 is carried out by a computing device, such as computing device 102 of FIG. 1, and can be implemented in software, firmware, hardware, or combinations thereof. In certain embodiments, process 500 is implemented by web data platform 300 of FIG. 3.

Initially, web data is obtained (act 502). The web data refers to, for example, web pages, indications of collections of web pages, behaviors, comments, and so forth. The web data can be obtained in a variety of different manners. For example, web data can be obtained by the user navigating to a web page using a web browser, receipt of a file over the Internet or other network, receipt of a file from a removable storage device, and so forth. Additionally, some web data, such as comments and indications of collections, can be obtained by receiving text, characters, selections of icons, or other (e.g., audible) input from a user of the device implementing process 500.

The obtained web data is stored in a web data store (act 504). This web data store is, for example, the data store layer 304 of FIG. 3. In one or more embodiments, any web data that is obtained in act 502 is stored in act 504. In other embodiments, a request from the user to store the web data is received, and only the requested data is stored.

An object model representing the web data in the web data store is generated (act 506). This object model generated in act 506 includes multiple objects, each representing a piece of web data from the web data store (e.g., each representing an item, a collection, or a comment). In one or more embodiments, the object model generated in act 506 is object model 330 of FIG. 3. In one or more embodiments, an object model representing the behaviors from the behavior store is also generated in act 506.

Having the object model, a request can be received from an application to perform an action on the web data (act 508). In one or more embodiments, this request is a request from a local application executing on the same computing device as is implementing process 500. Remote applications, as discussed above, can be notified of changes to the web data and can maintain their own copy of the web data, allowing such remote applications to access their own copy of the web data to perform an action on the data.

The action to be performed on the web data can be any of a variety of actions, and typically are the actions that are exposed as methods by the objects in the object model. This includes, for example, methods exposed by objects representing collections, items, comments, and behaviors. The request is received by the application invoking the appropriate method of the object in the object model.

The requested action is performed (act 510), and process 500 returns to act 506. If the action resulted in any change to the object model, then the change essentially results in a newly generated object model that incorporates the change. It is to be appreciated, however, that the portions of the object model that were not changed need not be re-generated.

In addition to receiving requests from applications, updates to web data can also be received (act 512). These updates are changes to the web data resulting from comparing the previously stored web data to new versions of the web data. Typically, these updates are received from engine layer 302 of FIG. 3. The received updated data is stored in web data store (514), and a new object model is generated representing this changed data (act 506). It is to be appreciated that the portions of the object model that were not changed are not re-generated in act 506. Notifications of this changed data can also be communicated to one or more applications as discussed herein.

Figure 6:
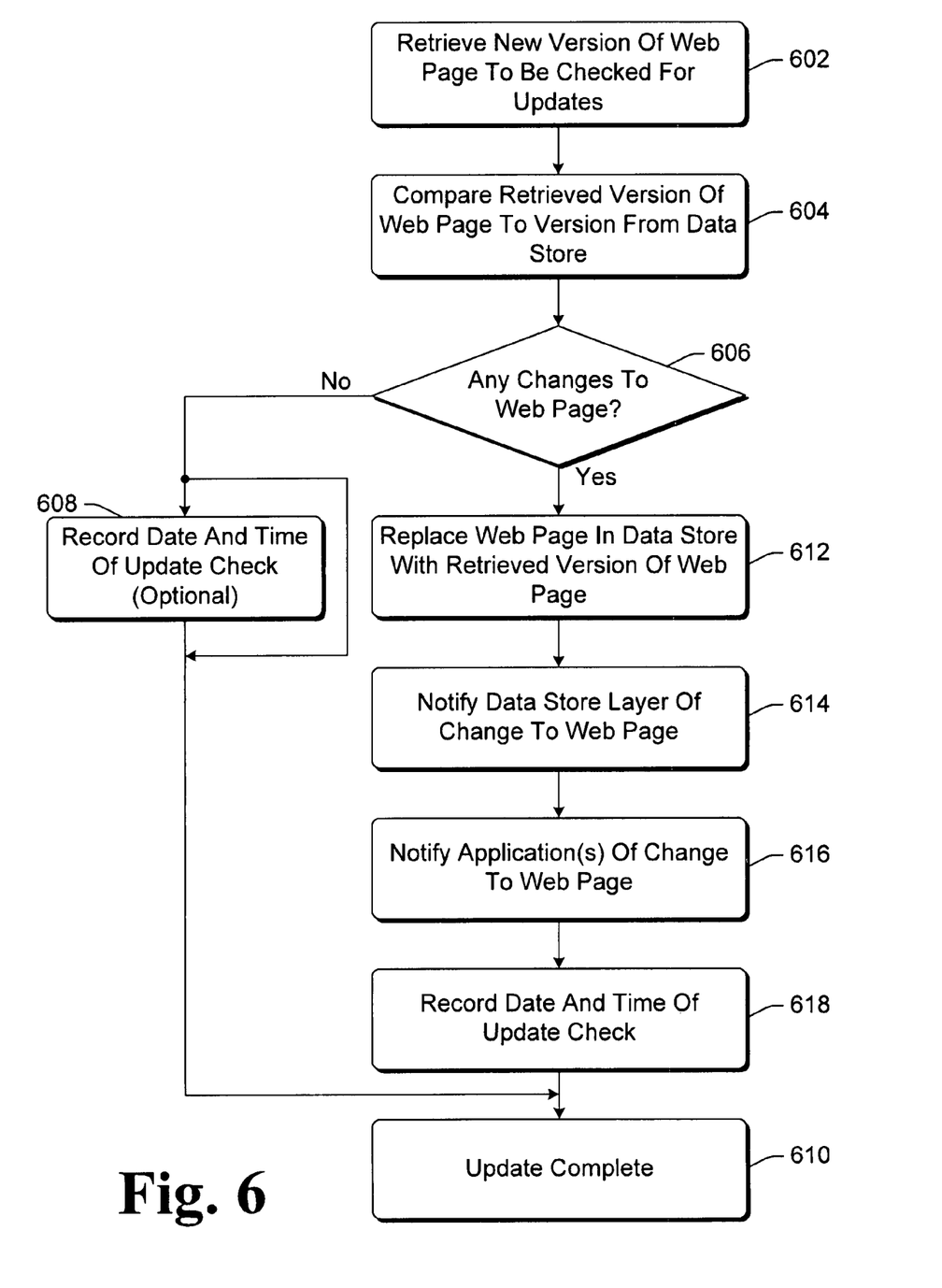
FIG. 6 is a flowchart illustrating an example process for updating web data in a data store layer in accordance with one or more embodiments.

FIG. 6 is a flowchart illustrating an example process 600 for updating web data in a data store layer in accordance with one or more embodiments. Process 600 is carried out by a computing device, such as computing device 102 of FIG. 1, and can be implemented in software, firmware, hardware, or combinations thereof. In certain embodiments, process 600 is implemented by web data platform 300 of FIG. 3.

Process 600 is performed for each web page each time it is to be checked for updates. How frequently a web page is updated can vary. In certain embodiments, the item corresponding to the web page stored in the data store layer includes meta data identifying how frequently the web page is to be updated. In other embodiments other mechanisms are used to determine the frequency, such as a user may input how frequently he or she would like the updating to occur, particular frequencies may be associated with different web pages or web pages having particular types of structured data, and so forth. The checking may be at regular intervals (e.g., once per day, once per hour, once every five minutes, and so forth), or at irregular intervals that can vary over time.

Initially, a new version of a web page to be checked for updates is retrieved (act 602). The location from which the new version is to be retrieved is identified, for example, in the meta data of the item corresponding to the web page stored in the data store layer.

The new version of the web page is then compared to the previously stored version of the web page in the data store (act 604). Given the comparison, a check is made as to whether there are any changes to the web page (act 606). A change to the web page could be the addition of some data to the web page, a deletion of some data from the web page, and/or a modification of data in the web page. Although process 600 is discussed with reference to checking for changes to the web page, alternatively changes to only a portion of the web page (e.g., structured data on the web page) may be checked for and updated in process 600.

If there are no changes to the structured data, then process 600 optionally records the date and time of the update check (act 608) in the meta data of the item corresponding to the web page in the data store layer. This date and time can be the date and time the new version of the web page was retrieved in act 602, the date and time the comparison was made in act 604, and so forth. Alternatively, act 608 may not be performed. Regardless of whether act 608 is performed, the update process 600 for this web page at this time is then complete (act 610). Additionally, the data store layer notifies any applications that have registered for notification of changes to the web data of the change to the web page (act 616).

Returning to act 606, if there are changes to the web page then the web page in the data store is replaced with the version of the web page retrieved in act 602 (act 612). The data store layer is also notified of the change to the structured data (act 614). The data store layer can be notified of the change by an explicit change command or indicator, or alternatively can be notified of the change implicitly by the web page being updated.

The date and time of the update check are also recorded (act 618) in the met data of the item corresponding to the web page in the data store layer. This date and time can be the date and time the new version of the web page was retrieved in act 602, the date and time the comparison was made in act 604, and so forth. The update process 600 for this web page at this time is then complete (act 610).

Figure 7:
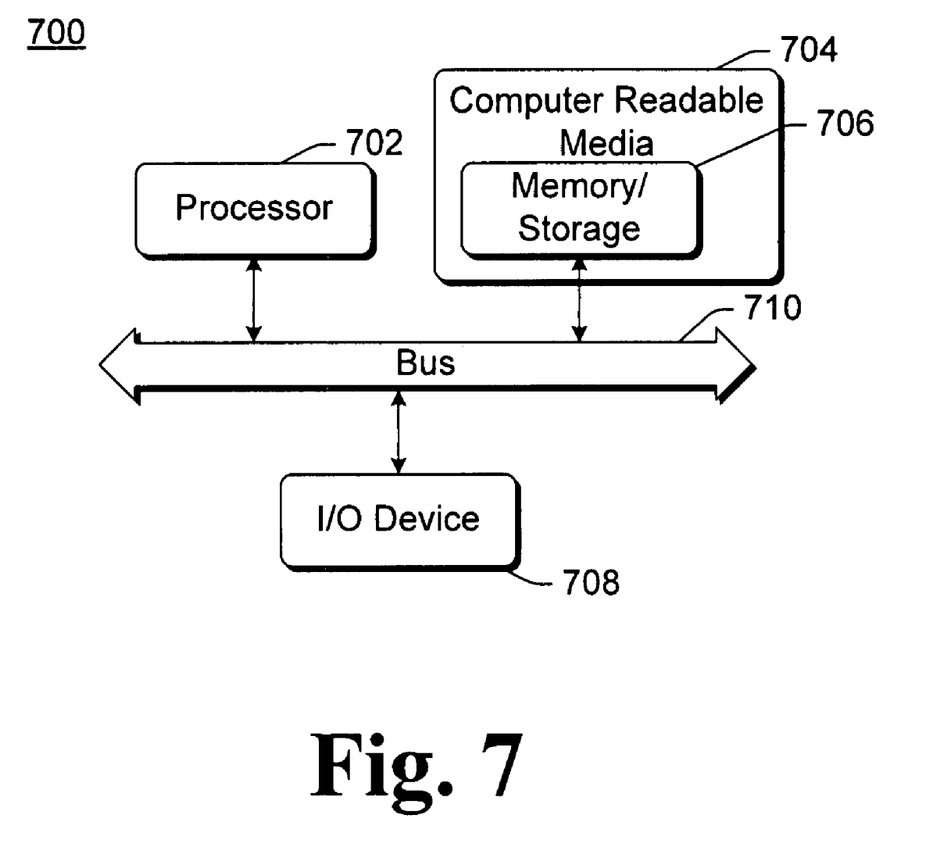
FIG. 7 illustrates an example computing device that can be configured to implement the web data usage platform in accordance with one or more embodiments.

FIG. 7 illustrates an example computing device 700 that can be configured to implement the web data usage platform in accordance with one or more embodiments. Computing device 700 can be, for example, computing device 102 of FIG. 1, and can implement, for example, platform 300 of FIG. 3.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or I/O device(s) 708 can be included as part of, or alternatively may be coupled to, computing device 700. Bus 710 represents one or more of any of several types of bus structures, including a memory bus or memory controller, a peripheral bus, an accelerated graphics port, and a processor or local bus using any of a variety of bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented in a computing device having a web data platform including an engine layer, a data store layer, a behavior store layer, and an API layer, the method comprising:

identifying via the engine layer web data that is collectable being present within page descriptions of one or more web pages accessed via the computing device;

collecting via the engine layer the web data from the page descriptions of the one or more web pages accessed via the computing device for storage in the data store layer implemented by the computing device, at least some of the web data being configured in a structured data format and associated with behaviors stored in the behavior store layer and executable by the computing device to enable interactions to use the collected web data with corresponding applications;

generating an object model to describe the collected web data, the object model having a plurality of objects that represent and enable access to the web data that is stored in the data store layer of the computing device, the plurality of objects of the object model arranged to represent items, collections, and properties of the collected web data;

exposing an application programming interface (API) via the API layer to enable interactions of a plurality of applications executing on the computing device with the web data in the data store layer including at least invoking the behaviors;

providing notifications to one or more of the plurality applications responsive to identifying a change to the web data;

receiving requests from the plurality of applications executing on the computing device to perform an action on the web data, the requests being received via invocation of one or more methods of the plurality of objects; and performing the requested action on the web data.

2. A method as recited in claim 1, the method further comprising:

receiving an additional request from a remote application executing on another computing device to access the web data;

allowing the remote application to access the web data.

3. A method as recited in claim 1, wherein providing notifications to one or more of the plurality applications further comprises:

identifying a change to the web data; and notifying the one or more of the plurality of applications of the identified change to the web data.

4. A method as recited in claim 1, the method further comprising:

displaying a user interface control allowing a user of the plurality of applications to select particular web data in the data store layer.

5. A method as recited in claim 1, the method further comprising:

checking whether a change to the web data has been made; and if the change has been made, then notifying one or more of the plurality of applications of the change to the web data.

6. A method as recited in claim 1, wherein the plurality of applications includes a web browser and one or more additional applications.

7. A method as recited in claim 1, wherein the web data comprises a plurality of web pages, wherein the data store layer stores each web page of the plurality of web pages as an item, wherein the data store layer further stores a plurality of collections, and wherein each collection of the plurality of collections identifies one or more items.

8. One or more computer readable storage media having stored thereon instructions that, when executed by one or more processors of a computing device, cause the one or more processors to implement a web data platform including an engine layer, a data store layer, a behavior store layer, and an API layer, the web data platform configured to:

identify via the engine layer web data that is collectable being present within page descriptions of one or more web pages accessed via the computing device;

collect via the engine layer the web data that is identified from the page descriptions of the one or more web pages;

store the web data in the data layer store of the computing device according to an object model that defines items, collections, and properties of the stored web data, the data layer store configured to store web data that is collected from multiple sources including at least the one or more web pages accessed via the computing device and one or more local applications of the computing device;

provide notifications via the data store layer to one or more applications responsive to identifying a change to the web data;

implement the application programming interface layer to:

expose one or more behaviors via the behavior store layer that are executable to allow one or more local applications executing on the computing device to access and make use of the web data that is collected and stored in the data store layer; and expose one or more behaviors via the behavior store layer that are executable to allow one or more remote applications executing on one or more other computing devices to access and make use of the web data in the data store layer, at least some of the web data collected automatically responsive to navigation of a browser of the computing device to the one or more web pages.

9. One or more computer readable storage media as recited in claim 8, wherein the one or more local applications include a web browser and web browser extensions.

10. One or more computer readable storage media as recited in claim 8, wherein the instructions further cause the one or more processors to implement the engine layer to detect changes to the web data by comparing the web data to data obtained from one or more source locations from which updates to the web data are retrieved, and to save the changes to the web data in the data store layer.

11. One or more computer readable storage media as recited in claim 10, wherein the data store layer is to fire an event when a change to the web data has been detected, the event notifying the one or more local applications and the one or more remote applications that the change to the web data has been detected.

12. One or more computer readable storage media as recited in claim 11, wherein the application programming interface layer comprises a synchronization protocol module to receive the event, to maintain a record of the change to the web data, and to communicate the change to the one or more remote applications.

13. One or more computer readable storage media as recited in claim 8, wherein the instructions further cause the one or more processors to implement the data store layer using a data storage device of the computing device.

14. One or more computer readable storage media as recited in claim 8, wherein the application programming interface layer includes a synchronization protocol module that accesses the web data in the data store layer on behalf of the one or more remote applications.

15. One or more computer readable storage media having stored thereon instructions that, when executed by one or more processors of a computing device, cause the one or more processors to implement a web data platform including an engine layer, a data store layer, a behavior store layer, and an API layer, the web data platform configured to:

detect via the engine layer web data contained within page descriptions associated with one or more web pages accessed by the computing device that is configured to be collected and stored in a web data store of the data store layer;

display, responsive to detection of the web data, a user interface control that is selectable to cause storage of the web data detected within the page descriptions of the one or more web pages in the web data store;

store, responsive to a selection of the user interface control, the web data in the web data store of the data store layer, the web data including structured data of multiple different data types that is associated with corresponding behaviors stored in the behavior store layer and executable by the computing device to enable interactions to use the collected web data with corresponding applications in particular ways according to the different data types;

provide notifications via the data store layer to one or more applications responsive to identifying a change to the web data;

generate an object model having a plurality of objects that represent the web data from the one or more web pages including objects to represent items, collections, and properties of the web data; and allow via the API layer both a web browser executing on the computing device and one or more other applications executing on the computing device to access the web data store via the object model and generate a user interface based at least in part on the one or more web pages having structured data including invoking the behaviors to retrieve and utilize the structured data for the user interface.

16. One or more computer readable storage media as recited in claim 15, wherein to allow the web browser and the one or more other applications to access the web data store via the object model is to allow the web browser and the one or more other applications to access the web data store by invoking one or more methods of the plurality of objects.

17. One or more computer readable storage media as recited in claim 15, wherein the instructions further cause the one or more processors to allow both the web browser and the one or more applications to enumerate which behaviors are stored in the behavior store layer of the computing device.

18. One or more computer readable storage media as recited in claim 17, wherein the behaviors are only the behaviors associated with a particular structured data type.

19. One or more computer readable storage media as recited in claim 15, wherein the instructions further cause the one or more processors to allow both the web browser and the one or more applications to invoke a behavior that is stored in the behavior store layer of the computing device.

20. One or more computer readable storage media as recited in claim 15, wherein the instructions further cause the one or more processors to display a user interface control that allows a user of the computing device to select a particular piece of structured data from the one or more web pages in the web data store that is to be accessed by the web browser or the one or more other applications.

* * * * *